United States Patent
Van Den Bosch et al.

(10) Patent No.: US 9,955,407 B2
(45) Date of Patent: Apr. 24, 2018

(54) RESPONDER DEVICE BINDING IN A WIRELESS SYSTEM

(75) Inventors: Bram Van Den Bosch, Berchem (BE); Wilhelmus Van Hoogstraeten, Weesp (NL); Jan Van Eetvelde, Sint-Niklaas (BE)

(73) Assignee: GreenPeak Technologies N.V., Zele (BE)

( * ) Notice: Subject to any disclaimer, the term of this patent is extended or adjusted under 35 U.S.C. 154(b) by 0 days.

(21) Appl. No.: 13/704,924

(22) PCT Filed: Dec. 12, 2011

(86) PCT No.: PCT/EP2011/072453
§ 371 (c)(1),
(2), (4) Date: Dec. 17, 2012

(87) PCT Pub. No.: WO2013/087088
PCT Pub. Date: Jun. 20, 2013

(65) Prior Publication Data
US 2014/0287684 A1     Sep. 25, 2014

(51) Int. Cl.
| | |
|---|---|
| H04B 7/00 | (2006.01) |
| H04W 48/16 | (2009.01) |
| H04W 8/00 | (2009.01) |
| H04W 4/00 | (2018.01) |
| H04W 84/18 | (2009.01) |

(52) U.S. Cl.
CPC ........... *H04W 48/16* (2013.01); *H04W 4/008* (2013.01); *H04W 8/005* (2013.01); *H04W 84/18* (2013.01)

(58) Field of Classification Search
CPC ..... H04W 48/16; H04W 4/008; H04W 8/005; H04W 84/18
(Continued)

(56) References Cited

U.S. PATENT DOCUMENTS

| | | | |
|---|---|---|---|
| 8,055,197 B2 | 11/2011 | Lyu et al. | |
| 8,059,573 B2 * | 11/2011 | Julian | H04W 4/206 370/238 |

(Continued)

FOREIGN PATENT DOCUMENTS

| | | |
|---|---|---|
| CN | 101563957 A | 10/2009 |
| CN | 101785331 A | 7/2010 |

(Continued)

OTHER PUBLICATIONS

International Search Report and Written Opinion mailed Sep. 28, 2012 in connection with International Application No. PCT/EP2011/072453, filed Dec. 12, 2011.

(Continued)

*Primary Examiner* — Yuwen Pan
*Assistant Examiner* — Fatuma Sherif
(74) *Attorney, Agent, or Firm* — Withrow & Terranova, P.L.L.C.

(57) ABSTRACT

A wireless system (10) comprises an initiator device (11) and a plurality of responder devices (15-18) which can bind with the initiator device (11). The method comprises, at one of the plurality of responder devices, receiving (101) a discovery request from the initiator device and forming a discovery response and sending the discovery response to the initiator device. The step of forming a discovery response comprises: collecting (102) at least two parameters indicative of the initiator device wanting to bind with the responder device; computing (103) a score using the at least two parameters, the score being indicative of a likelihood of the initiator device wanting to bind with the responder device; and including (104) the score as an element of the discovery response.

18 Claims, 8 Drawing Sheets

(58) Field of Classification Search
USPC .......................................................... 455/41.2
See application file for complete search history.

(56) References Cited

U.S. PATENT DOCUMENTS

| | | |
|---|---|---|
| 8,190,096 B2 | 5/2012 | Rutjes et al. |
| 8,514,758 B2 | 8/2013 | De Kimpe et al. |
| 9,059,775 B2 * | 6/2015 | Qin ........................ H04W 12/06 |
| 9,301,121 B2 | 3/2016 | Park |
| 2008/0146151 A1 * | 6/2008 | Lyu et al. .................... 455/41.2 |
| 2009/0175227 A1 * | 7/2009 | Hyounhee ............. H04W 28/18 370/329 |
| 2012/0297440 A1 * | 11/2012 | Reams et al. ................. 725/131 |
| 2016/0157242 A1 | 6/2016 | Bosch et al. |

FOREIGN PATENT DOCUMENTS

| | | |
|---|---|---|
| KR | 100755711 B1 | 9/2007 |
| KR | 10-2008-0056525 A | 6/2008 |
| WO | 2009/009452 A1 | 1/2009 |

OTHER PUBLICATIONS

International Preliminary Report on Patentability for PCT/EP2011/072453, mailed Jun. 17, 2014, 6 pages.
First Office Action for Chinese Patent Application No. 201180074956.0, dated Apr. 28, 2017, 26 pages.
Notice of Preliminary Rejection for Korean Patent Application No. 10-2014-7013493, dated Aug. 21, 2017, 7 pages.
Notice of Allowance for Korean Patent Application No. 10-2014-7013493, dated Nov. 29, 2017, 3 pages.

* cited by examiner

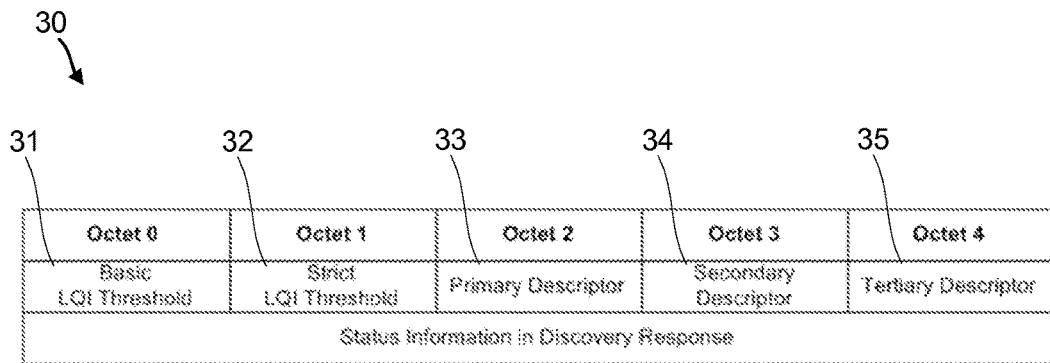
Fig. 5
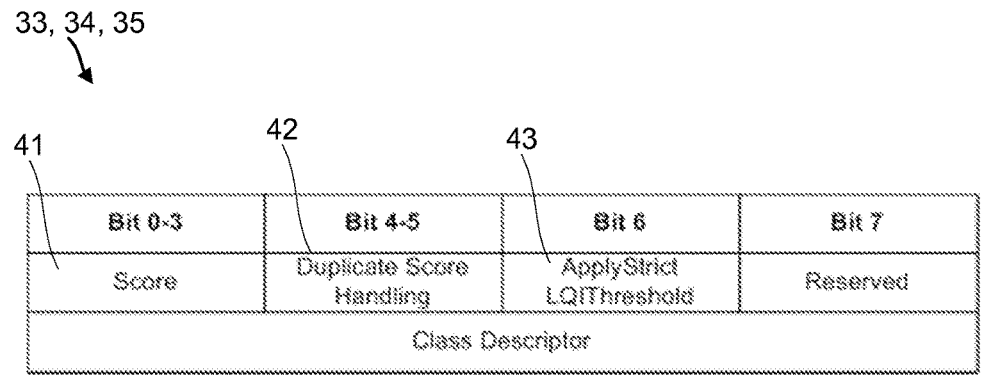
Fig. 6
| Bit 5:4 | Description |
|---|---|
| 00 | Use responder as is |
| 01 | Remove responder |
| 10 | Reclassify responder |
| 11 | Abort binding |
Fig. 7

RESPONDER DEVICE BINDING IN A WIRELESS SYSTEM

CROSS-REFERENCE TO RELATED APPLICATIONS

This application is a § 371 national stage entry of International Application No. PCT/EP2011/072453, filed Dec. 12, 2011, the entire contents of which are incorporated herein by reference.

FIELD OF THE INVENTION

This invention relates to forming a binding between two wireless devices, and to ranking responder wireless devices when forming the binding as well as to the wireless devices themselves, a system including the wireless devices, a control apparatus for such a wireless device, a method for use in such a wireless system and software for executing such a method.

BACKGROUND OF THE INVENTION

There are various situations where it is necessary to form a binding, also called a pairing, between two wireless devices. One example situation is in a Wireless Personal Area Network (WPAN). A type of WPAN is a wireless remote control system, comprising a remote control handset and devices which can be controlled by the handset, such as consumer electronics devices (e.g. set-top boxes, television, media players), lighting devices, environmental devices. The new generation of remote controls will use radio frequency (RF) connectivity rather than infrared (IR) connectivity and will use little or no power. RF connectivity allows a reliable connection to be formed throughout a premises. A candidate technology is ZigBee RF4CE (ZigBee Radio Frequency for Consumer Electronics).

Based upon the 2.4 GHz, IEEE 802.15.4 standard, the ZigBee Alliance has expanded the ZigBee RF4CE standard into several end user application areas. These three profiles, all using RF4CE, encompass ZigBee Interface Devices, ZigBee 3D Sync and ZigBee Remote Control. Next to these standardised profiles, ZigBee RF4CE fully supports the development of proprietary profiles.

The fact that RF wireless technologies do not require a line-of-sight path between two devices also poses a new challenge. An IR transmitter and receiver are implicitly paired by pointing the transmitter (e.g. remote control handset) towards the receiver device. Two RF-based devices require an explicit pairing, called a binding, using a binding procedure. The binding procedure ensures that the "controller" (Remote Control) is controlling the correct "target" (e.g. television, set-top box). It is typically only required once during the lifetime of the product.

A pairing can be performed using an out-of-band mechanism. One example is described in the whitepaper "Bluetooth® User Interface Flow Diagrams for Bluetooth Secure Simple Pairing Devices" available at https://www.bluetooth.org/Technical/Specifications/whitepapers.htm. This requires a secondary, secure, non-Bluetooth channel to pass information when pairing two devices. In this type of pairing mechanism, the controlling RF device is informed about the address of the target RF device and vice versa, potentially complemented with security keys and other relevant information. This kind of pairing can be performed in the factory, by an installer/service technician (using a dedicated binding/commissioning device) or by the user (e.g. setting switches). These are all sub-optimal solutions as they either create logistical issues or inhibit do-it-yourself (DIY) installations.

More advanced binding procedures have been proposed and used, not only in IEEE 802.15.4 based systems, but also in Bluetooth-based and WiFi-based systems. These binding procedures generally comprise two phases. Firstly, in a discovery phase, the initiating device (typically controller) identifies all compatible devices (typically targets) in its neighborhood. This provides the initiating device with a list of candidates to bind with. These "binding candidates" can be ranked using a parameter such as link quality. Throughout the rest of this document, the initiating device will be called the "initiator" or "initiator device" (typically controller), and the devices that respond to the "initiator" will be called the "responders" or "responder devices" (typically target). Secondly, in an authentication phase, the initiator will temporarily set up a link with the responder that was ranked the highest in the discovery phase. The devices will perform an authentication procedure to verify that the initiator has set up a link with the intended responder. When this is successful, the initiator is bound with the responder and vice versa. When it fails, the initiator will set up a link with the next highest ranked responder and repeat the authentication procedure. This is repeated until the initiator is bound with the intended responder (an authentication procedure was successful), or the list of responders became empty (all authentication procedures failed). The authentication procedure comes in many forms, such as a simple button press on both sides, or entering a key code shown on the other device, to procedures that explicitly exploit the knowledge of security credentials like certificates.

In some cases, the binding procedure supposes the discovery phase to discover exactly one responder in which case the identification/authentication phase becomes obsolete. For example, in ZigBee RF4CE ZRC, a target will only respond to the discovery request of the controller if a button on the target is pressed. The controller will bind with this target, if and only if it was the only device that was discovered. If more than one target responds, the ambiguity cannot be resolved and the binding process is stopped by the controller.

The ranking of responders that is performed in the discovery phase ensures a good user experience. Indeed, when a lot of devices are within RF range, the list of responders can be long, and cycling through all of them can become time consuming.

An initiator device may use one or more parameters to determine if a responder device is a device that the initiator device wishes to bind with. Combining these parameters into a good heuristic for the ranking procedure is not always straightforward and is application dependent. This can result in continuous updates to the ranking procedure, based on newly gathered user feedback, even after devices have been deployed in the field. Updating the ranking procedure is cumbersome when the initiator device does not have direct internet access (untethered or partly-tethered device), such as a typical remote control handset. It requires support to update the device, usually by an over-the-air (OTA) update of the program memory, in which the new program image is first transferred to another device (TV or STB) that features internet access and next is transferred over RF from that device to the Remote Control.

SUMMARY OF THE INVENTION

The present invention seeks to provide an alternative method or system of ranking devices when forming a binding in a wireless system.

A first aspect of the present invention provides a method for use in a wireless system comprising an initiator device and a plurality of responder devices which can bind with the initiator device, the method comprising, at one of the plurality of responder devices:

receiving a discovery request from the initiator device;
    forming a discovery response; and
    sending the discovery response to the initiator device,
wherein the step of forming a discovery response comprises:
    collecting at least two parameters indicative of the initiator device wanting to bind with the responder device;
    computing a score using the at least two parameters, the score being indicative of a likelihood of the initiator device wanting to bind with the responder device; and
    including the score as an element of the discovery response.

An advantage of a method according to an embodiment of the invention is that the initiator device can use simple logic to rank responder devices, such as a generic ranking algorithm which ranks responder devices according to their scores. This simplifies the logic required at the initiator device. Therefore, the initiator device can be a relatively simple device, such as a device with limited processing power. The logic which computes the score can be tuned on the responder side without impacting the logic used on the initiator device, thereby avoiding the need to update the initiator device. The method is particularly advantageous where the initiator device has limited (or no) direct connectivity to an external network.

Advantageously, the score can take one of at least two (or a larger number) of different values.

Advantageously, the step of computing a weighted sum of the at least two parameters.

Advantageously, the step of forming a discovery response further comprises including a duplicate score handling element which indicates one of a plurality of actions to be taken by the initiator device in the event that another responder device has the same score as the responder device. The duplicate score handling element can indicate one of the following actions: keep responder devices having the same score in a ranking list of the initiator device and order them using a tie break function (for example, based on link quality); remove responders with the same score from a ranking list of the initiator device; abort the discovery procedure when two or more responder devices with the same score are discovered; re-rank the responder devices using another descriptor of the discovery response.

Advantageously, the step of forming a discovery response comprises forming: a primary descriptor comprising the computed score and a duplicate score handling element, in which the duplicate score handling element indicates one option for how the initiator device should behave in the event that another responder device has the same score as the score in the primary descriptor of the responder device; and a secondary descriptor comprising a computed score that is lower than the score in the primary descriptor.

Advantageously the at least two parameters comprise at least one of the following: a parameter indicating whether a line of sight connection exists between the initiator device and the responder device; a parameter indicating that the responder device is within a predetermined range of the initiator device; a parameter indicating that the responder device is not yet bound with any other device; a parameter indicating a time period since the responder device was rebooted, or indicating that a predetermined time period has elapsed since the responder device was rebooted; a parameter indicating that the responder device is currently in an operating state to form a binding; a parameter indicating that the initiator device is a default controller for the responder device.

Advantageously, the step of forming a discovery response comprises including a link quality threshold as an element of the discovery response. The link quality threshold can be a link quality threshold which the initiator device should apply to the discovery response from this responder and should remove the responder device from a ranking list if the measured link quality is worse than the threshold. The link quality threshold can be a link quality threshold which the initiator device should apply to the discovery response from this responder, only if an element in the discovery response indicates to do so.

Advantageously, the method further comprises updating logic used by the responder device to perform the step of collecting at least two parameters or the step of computing a score.

Another aspect of the invention provides a method for use in a wireless system comprising an initiator device and a plurality of responder devices, the method comprising, at the initiator device:

sending a discovery request to discover responder devices;
    receiving a discovery response from each of a plurality of responder devices; and
    ranking the plurality of responder devices using the discovery responses;
wherein each of the discovery responses comprises a score computed by the responder device, based on parameters collected by the responder device indicative of the likelihood of the initiator device wanting to form a binding with that responder device, and wherein the step of ranking the responder devices uses the scores.

Advantageously, the method further comprises attempting to complete a binding with the responder device having the highest score.

Advantageously, the discovery response further comprises a duplicate score handling element and if a duplicate score is received in a discovery response from two or more responder devices, the method comprises using the duplicate score handling element to process those discovery responses.

Advantageously, the duplicate score handling element can indicate one of the following options; keep the responder devices having the same score in the ranking and order according to a tie breaker function; remove responders with the same score from a ranking list of the initiator device; abort the discovery procedure when two or more responder devices with the same score are discovered; re-rank the responder devices using another descriptor of the discovery response.

Advantageously, the discovery response received from each responder device comprises: a primary descriptor comprising the computed score and a duplicate score handling element, in which the duplicate score handling element indicates one option for an action to be taken by the initiator device in the event that another responder device has the same score as the score in the primary descriptor of the responder device; a secondary descriptor comprising a computed score that is lower than the score in the primary descriptor; and the step of ranking the responder devices uses the primary descriptor in each of the discovery responses before using the secondary descriptor.

Advantageously, the method further comprises measuring a link quality of the discovery response and the method comprises comparing the measured link quality with a link quality threshold and removing the responder device from the ranking list if the measured link quality is worse than the threshold.

Advantageously, the method further comprises measuring a link quality of the discovery response and the method comprises comparing the measured link quality with a link quality threshold and removing the responder device from the ranking list if the measured link quality is lower than the threshold, if an element that is carried in the discovery response indicates to do so.

Embodiments of the invention can be applied to wireless systems such as: Wireless Personal Area Networks (WPAN), e.g. ZigBee, Bluetooth or any other IEEE 802.15 network, Wireless Local Area Networks (WLAN). Embodiments can be applied to wireless (RF) remote control systems where the controller handset has limited connectivity to an external network. In particular, embodiments can be applied to the ZigBee RF4CE MSO profile as intended to be used in set-top boxes, televisions and their corresponding remote controls. Embodiments of the invention can be applied to Body Area Networks, Home Area Networks and Electronic Shelf Tag Networks.

The functionality described here can be implemented in hardware, software executed by a processing apparatus, or by a combination of hardware and software. The processing apparatus can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to perform the required functions. Another aspect of the invention provides machine-readable instructions (software) which, when executed by a processor, perform any of the described methods. The machine-readable instructions may be stored on an electronic memory device, hard disk, optical disk or other machine-readable storage medium. The machine-readable instructions can be downloaded to the storage medium via a network connection.

BRIEF DESCRIPTION OF THE DRAWINGS

Embodiments of the invention will be described, by way of example only, with reference to the accompanying drawings in which:

FIG. 5 shows status information carried in a discovery response;

FIG. 6 shows a descriptor forming part of the status information of FIG. 5;

FIG. 7 shows duplicate score handling actions;

DETAILED DESCRIPTION OF AN EMBODIMENT

Figure 1:
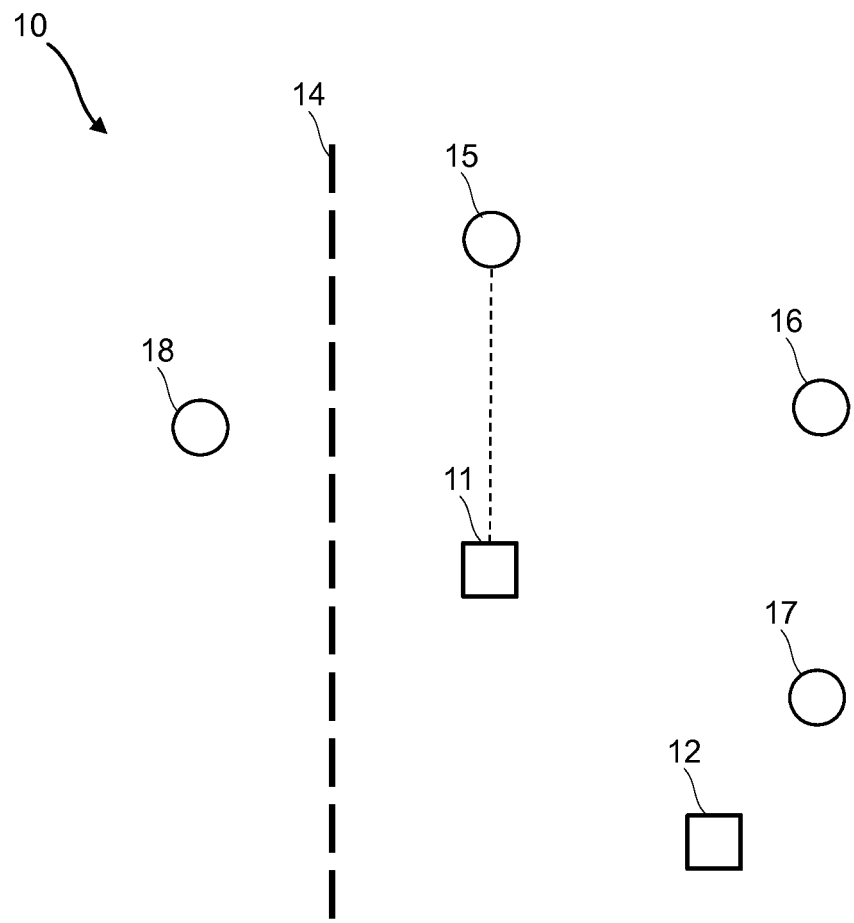
FIG. 1 shows a wireless system in which an embodiment of the invention can be implemented.

In the following detailed description of the preferred embodiments, reference is made to the accompanying drawings, which form a part hereof, and within which are shown by way of illustration specific embodiments by which the invention may be practiced. The drawings described are only schematic and are non-limiting. In the drawings, the size of some of the elements may be exaggerated and not drawn on scale for illustrative purposes. Those skilled in the art will recognize that other embodiments may be utilized and structural changes may be made without departing from the scope of the invention.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. Thus, the scope of the expression "a device comprising means A and B" should not be limited to devices consisting only of components A and B. It means that with respect to the present invention, the only relevant components of the device are A and B.

FIG. 1 shows a wireless system embodying the invention. A Wireless Personal Area Network (WPAN) in the form of a wireless remote control system will be used as an example of a wireless system. Embodiments can be applied to other types of WPAN or to Wireless Local Area Networks (WLAN) where there is a need to form a binding or pairing between devices. Examples include: input devices (e.g. mouse, keyboard, tablet, wand, pointer), output devices (e.g. display, 3D glasses), sensors, actuators.

FIG. 1 shows an RF remote control system 10 with a controller 11 and multiple target devices 15-18. Controller 11 is capable of controlling any of the devices 15-18. A binding process is used to form a pairing between the controller 11 and one or more of the devices 15-18 that a user of the system wishes to control. The user of controller 11 may wish to bind with all of devices 15-18, or only some of them. There can be various reasons why a user may not wish to form a binding between the controller 11 and a device. For example, in FIG. 1 device 18 is located close to controller 11, and therefore within RF range of the controller 11, but is located in another property. Therefore, the user of controller 11 does not wish to control device 18. This situation can occur in apartment buildings, adjoined houses, office spaces and so on. The controller 11 may be intended to control consumer electronics devices, and there may be another controller 12 to control environmental devices (lighting, heating etc.). Therefore controller 11 may only wish to bind with consumer electronics devices, such as a television, set-top box, media player. More than one controller 11, 12 can be deployed in the same area. A device 15-18 may form a binding relationship with only one controller, or more than one controller. For example, a television may form a binding with a dedicated television controller (such as a controller provided with the television) and may also form a binding with a multi-function controller which can control multiple devices.

Figure 2:
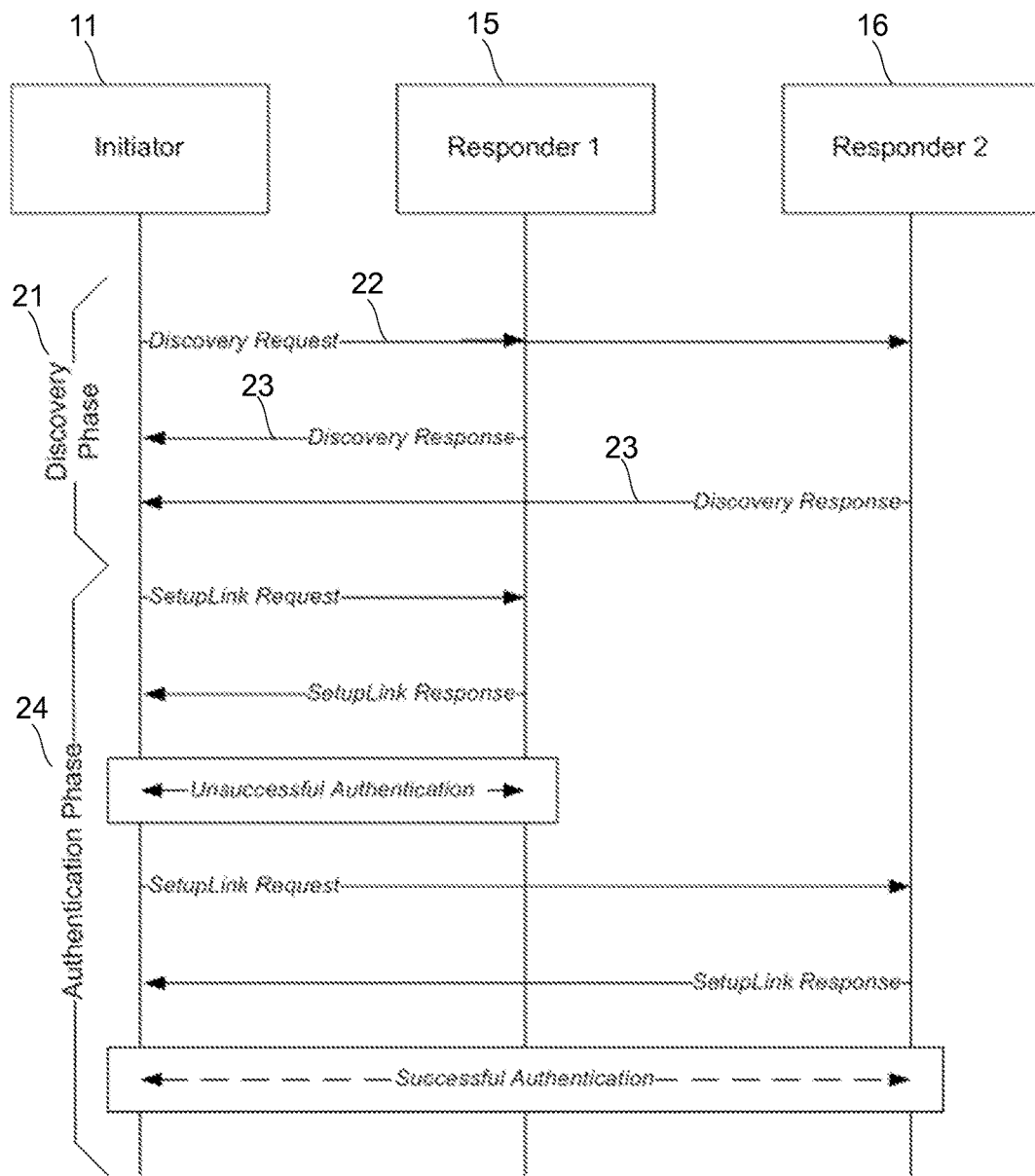
FIG. 2 shows a binding process for devices in the system of FIG. 1.

The binding process is shown in FIG. 2. The binding process comprises a discovery phase 21 and an authentication phase 24. The binding process is initiated by the controller 11. In the following description, the controller 11 will be called an initiator device. The discovery phase 21 allows the initiator 11 to discover which devices are present in the area surrounding the initiator 11 and to rank potential responder devices to bind with. During the discovery phase, the initiator sends a discovery request 22 to all devices within range of the initiator 11. The discovery request 22 is received by one or more devices 15, 16 within range of the initiator. These devices respond with a discovery response 23. In the following description, the devices which respond will be called responder devices. FIG. 2 shows responses 23 received from two responder devices 15, 16.

In accordance with embodiments of the invention, each of the responder devices 15, 16 collects information which is indicative of whether the initiator device 11 is likely to want to bind with the responder device 15, 16. Each responder device 15, 16 computes a score using the information. The score is indicative of a likelihood of the initiator device wanting to bind with the responder device. The score is included as an element of the discovery response 23.

The initiator device 11 receives a discovery response 23 from each of the responder devices 15, 16. The initiator device uses the scores to rank the responder devices. The initiator device then uses the ranking to select one, or more, of the responder devices as candidates for forming a binding. The binding process proceeds to the authentication phase 24. The initiator will set up a temporary link with the responder that has the highest ranking determined in the discovery phase and the temporary link is used to check whether the ranking resulted in the desired responder selection. If not, the initiator will set up a link with the next highest-ranked responder and perform the same check again. This is repeated until the initiator is bound with the intended responder (the binding procedure was successful), or the list of responders became empty (the binding procedure has failed).

Figure 3:
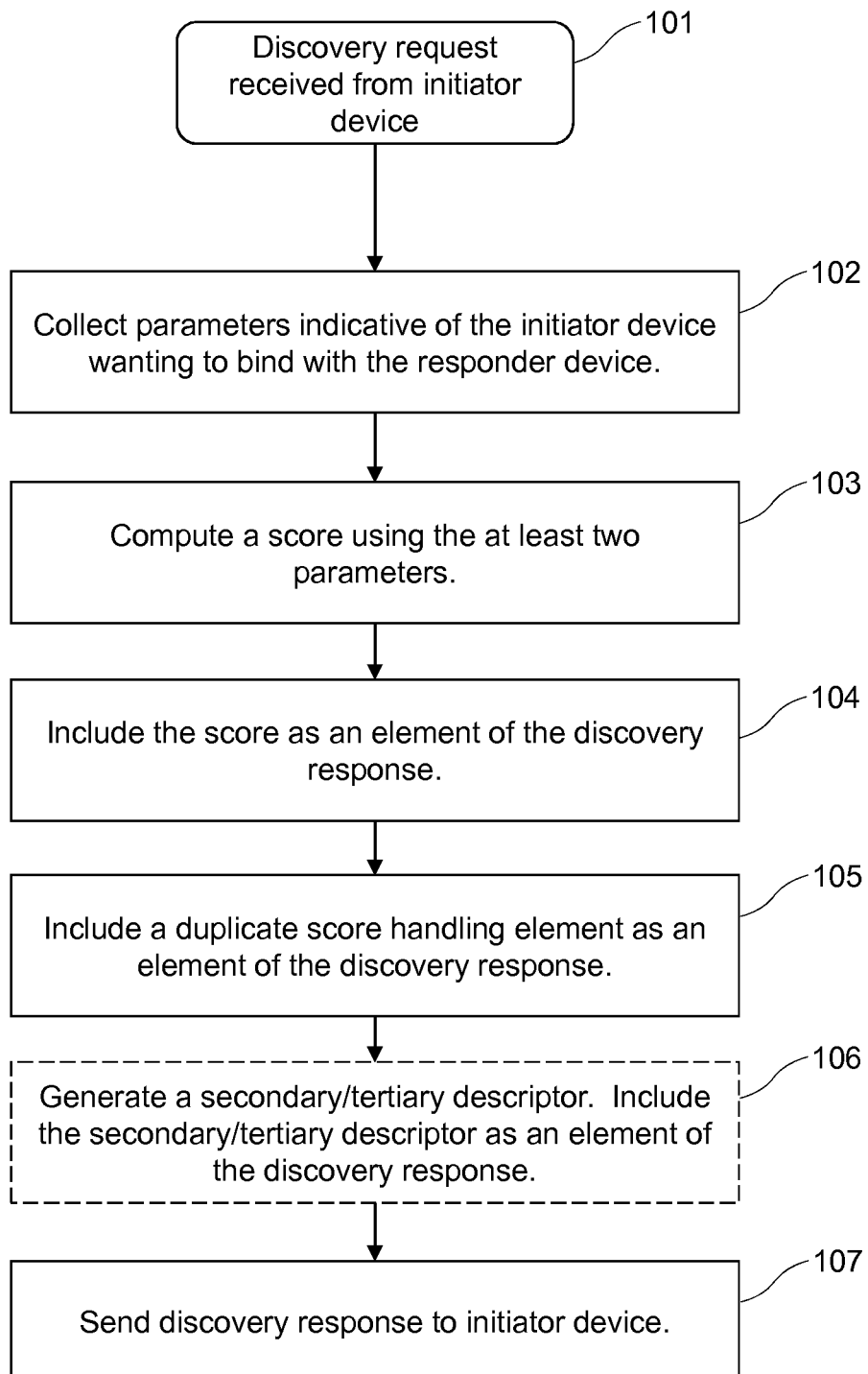
FIG. 3 shows a method performed at each of the responder devices during the discovery phase of the binding process.

FIG. 3 shows a method performed at each of the responder devices 15, 16 during the discovery phase 21 of the binding process. At step 101 a discovery request is received from an initiator device. At step 102 the responder device collects information which is indicative of whether the initiator device 11 is likely to want to bind with the responder device. Step 102 can be performed subsequently to step 101, as shown in FIG. 3, or it can be performed as a background activity before receiving the discovery request. At step 103 the responder device computes a score using the at least two parameters. The score can have a range of at least two possible values, although more advantageously has a higher range of possible values, such as four values (which can be represented by 2 bits), eight values (which can be represented by 3 bits), sixteen values (which can be represented by four bits), or some other range of values. Step 103 uses logic, or heuristics, stored at the responder device. At step 104 the responder device includes the score as an element of the discovery response. At step 105 the responder device can include a duplicate score handling element as an element of the discovery response.

The duplicate score handling element indicates how the initiator device should handle this responder device in the event that two responder devices report the same score. The score and duplicate score handling element can form part of a primary descriptor. Optionally, at step 106 the responder device can include a secondary descriptor and a tertiary descriptor. At step 107 the responder device sends the discovery response to the initiator device.

Figure 4:
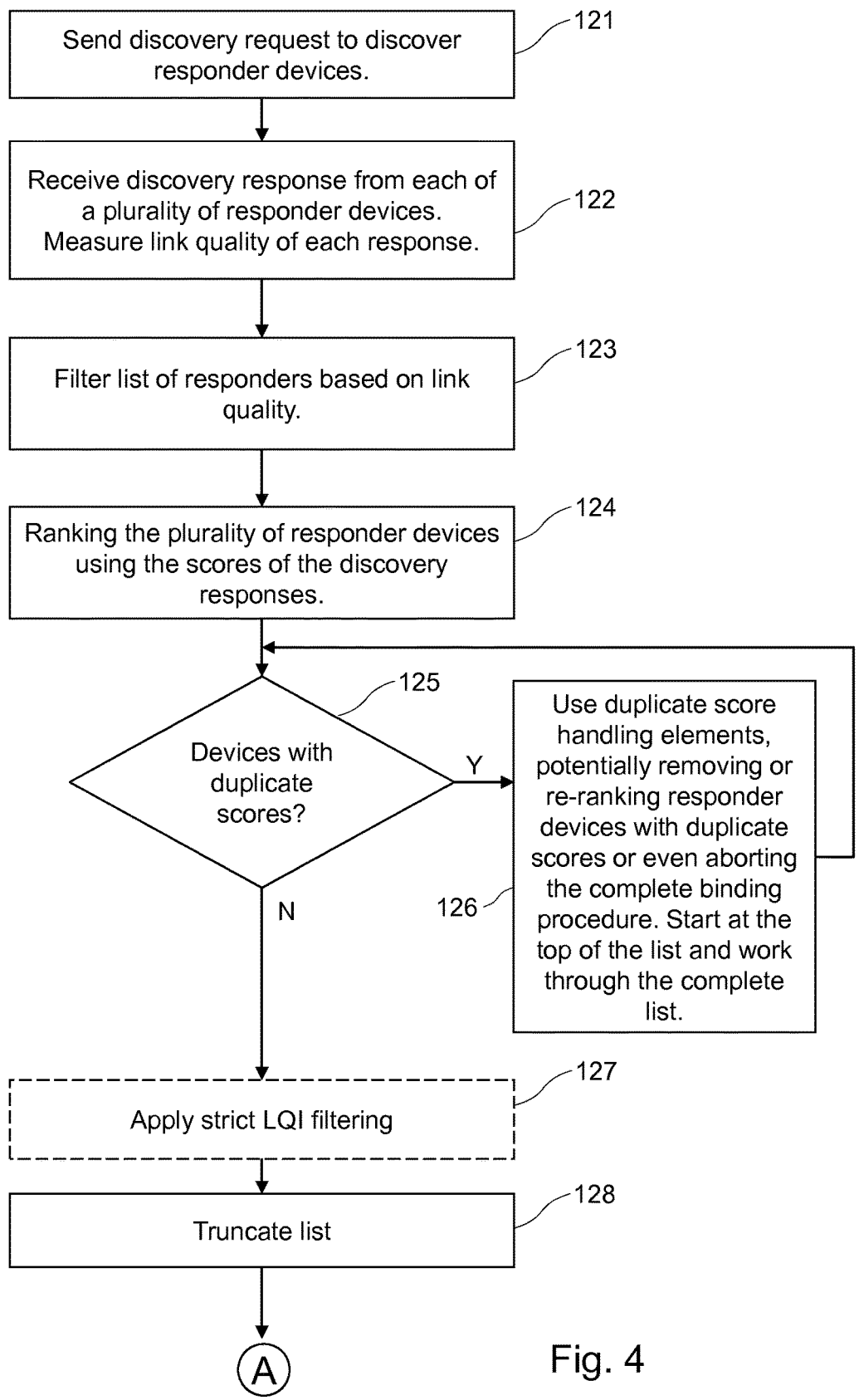
FIG. 4 shows a method performed at the initiator device during the discovery phase of the binding process.

FIG. 4 shows a method performed at the initiator device 11 during the discovery phase 21 of the binding process. At step 121 the initiator device sends a discovery request to discover responder devices. At step 122 the initiator device receives a discovery response from each of a plurality of responder devices. Advantageously, the initiator device measures link quality of the signal carrying the discovery response. The discovery responses provide the initiator device with a list of responder devices that the initiator device can possibly bind with. This list of responders can be ranked, filtered and truncated at steps 123-128 to obtain a list of binding candidates.

At step 123 the list of responder devices can be filtered based on link quality. Advantageously, each discovery response comprises a field which includes a threshold link quality indicator (LQI) value to be used at step 123. Step 123 will be called Basic LQI Threshold filtering. The initiator device removes all responders for which the LQI of the discovery response (measured at step 122) is below the 'Basic LQI Threshold' as indicated in the status information of the discovery response.

At step 124 the initiator device ranks the plurality of responder devices using the scores in the discovery responses. This initial ranking ranks the responder devices based on the score in the primary descriptor 33 of the status information 30 of the discovery response. The higher the number, the higher the responder ends up in the list.

Step 125 checks if there are two devices with the same score. If so, the method proceeds to step 126 and resolves these duplicate scores. There are various ways to resolve these duplicate scores. Advantageously, step 125 is applied to all of the devices in the list of responder devices, starting from the top of the list and working towards the bottom of the list. When one of the responders in the top of the list is re-ranked, it will end up lower in the list and can again become a duplicate, which will trigger a new "duplicate score handling" procedure. Advantageously, this "duplicate score handling" step is performed over the complete list first, before the optional "truncate" step 128 is performed, to ensure the correct responders are "truncated" away. The initiator device checks the list for node descriptors with non-unique scores. If such responders are found they are handled according the 'Duplicate Score Handling' field in the primary descriptor. This might result in the binding procedure to be aborted, the responder to be kept in the list, the responder to be removed from the list, or the responder to be re-ranked, based on the score in the secondary descriptor.

If this again yields a non-unique score, the 'Duplicate Score Handling' field of the secondary descriptor is used to handle them. This might again result in the binding procedure to be aborted, the responder to be kept in the list, the responder to be removed from the list, or the responder to be re-ranked based on the score in the tertiary descriptor.

If this again yields a non-unique score, the 'Duplicate Score Handling' field of the tertiary descriptor is used to handle them. This might result in the binding procedure to be aborted, the responder to be kept in the list or the responder to be removed from the list. The action specified in the duplicate score handling is only executed on the device that carries that specific duplicate score handling field. So the responder that has "Re-rank" specified will be re-ranked, the responder that has "Remove" will be removed from the list, and the responder that has "Keep" specified, will be kept in the list. In case one of the responders has "Abort" specified, the complete procedure is aborted, so in this case, there is indeed a "side effect" of the responder carrying "abort" on all the other responders, as the complete procedure is aborted.

Optionally, at step 127, a further filtering can be applied based on link quality. This will be called Strict LQI filtering. Each discovery response can comprise a field Which includes a threshold link quality value to be used at step 127. The initiator device removes all responders for which the LQI of the discovery response is below the 'Strict LQI threshold', if and only if the 'Apply Strict LQI Threshold' is set in the final descriptor that was used in the ranking process.

Figure 8:
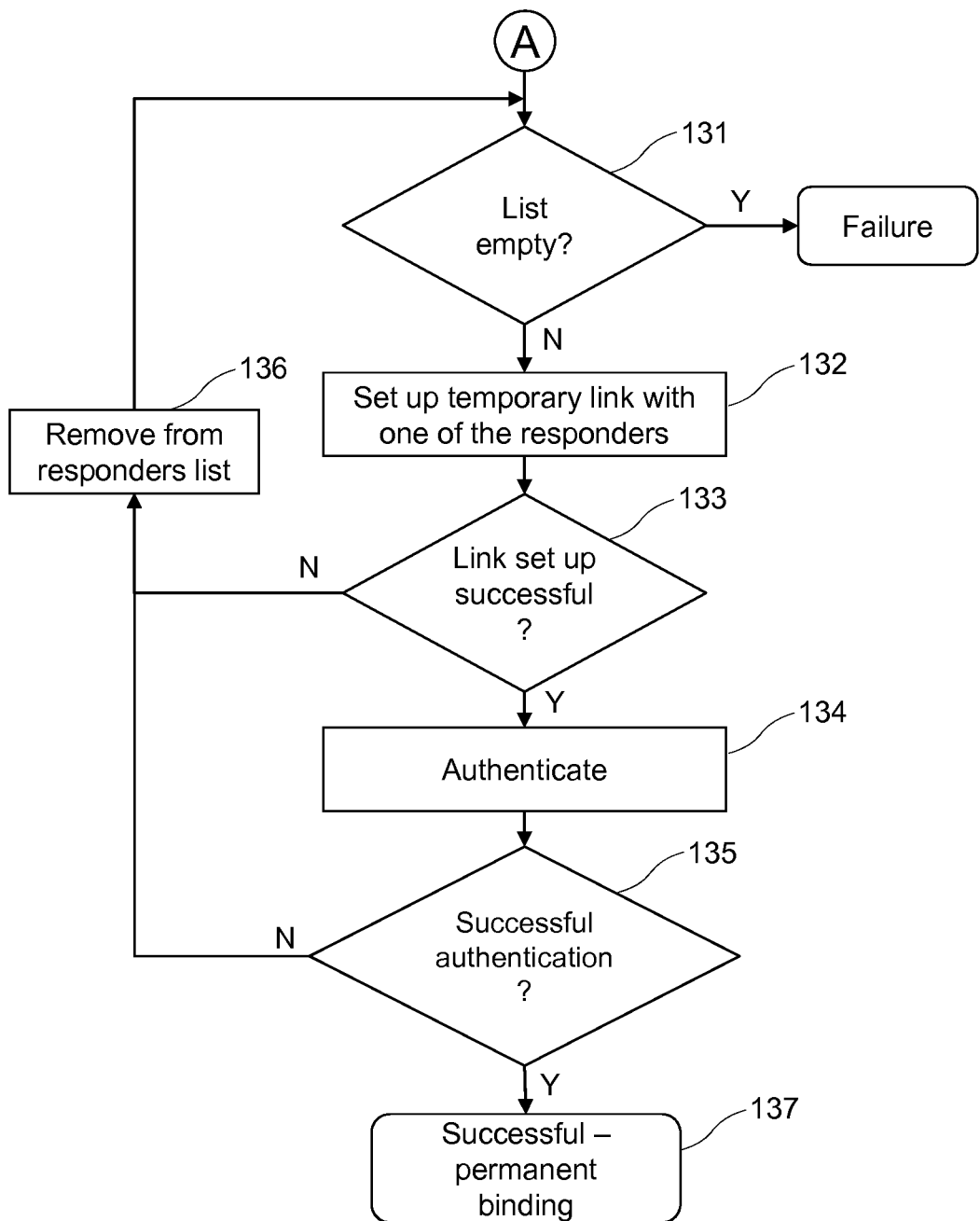
FIG. 8 shows a method performed at the initiator device during the authentication phase of the binding process.

The list can be truncated at step 128. The top N responders shall form the binding candidates list. The method shown in FIG. 4 will obtain a list of up to N binding candidates, ranked in order of their scores. The method proceeds to an authentication phase which is shown in FIG. 8.

Referring again to FIG. 3, the following list of parameters is provided as an example of parameters that a responder device can collect. A responder device can use one or more of these parameters. A responder device can use other parameters not listed here.

Link Quality. The term "link quality" can be defined in various ways, such as receive level, RSSI (received signal strength indicator) value, signal quality, Bit Error Rate (BER), signal-to-noise ratio or a combination of these. Link quality can be measured for the discovery response signal received by the initiator. Link quality can be related to score value, e.g. a high link quality (better link) results in a high score.

Time Since Last Boot. The length of time that has elapsed since the responder was last booted can be taken into account when calculating the score. This parameter can record the actual time, or can indicate if a threshold time value has been passed since the last boot occurred. Time since last boot can be inversely related to score value, e.g. a short time since last boot, or an indication that the threshold time value since last boot has not been passed, results in a high score.

Empty Binding Table. Each responder device maintains a binding table of controllers it has formed a binding with. If the responder has not yet bound to any controller, this can be taken into account when calculating the score.

Binding Instruction Screen Visible. The responder device can have a Graphical User Interface (GUI), such as a display screen, to provide instructions to a user. When the responder is showing Binding Instructions on its GUI, this can be taken into account when calculating the score. The presence of binding instructions on the GUI are indicative that a user wishes to bind at that point in time.

Line Of Sight. If the controller 11 and device both have a line of sight communication interface, such as an infrared (IR) interface, controller 11 can determine if a device is within line of sight communication with the controller 11. Referring again to FIG. 1, there is a line of sight path between the controller 11 and device 15. There is not a line of sight between the controller 11 and device 18, due to a barrier 14. The presence of a line of sight path between the controller 11 and device can indicate the controller wishes to bind with the device and can be taken into account when calculating the score.

In Area. When the responder can detect that the initiator is within a certain range of the responder, this can be taken into account when calculating the score.

Allow For Duration. When a particular button (e.g. "service" button) is pressed on the responder, or such a button press is emulated via a remote service message, this can be taken into account when calculating the score.

ID of initiator. The responder can check if an identifier sent in the discovery request, identifying the responder device, indicates that the initiator device is the default controller for the responder device. The indicator can be explicitly provided, or may be obtained from version information or some other information sent in the discovery request. If the initiator is especially designed to control the responder, this can be taken into account when calculating the score.

Each responder device 15, 16 forms a discovery response. FIG. 5 shows one example form of status information 30 in the discovery response. The first two octets 31, 32 contain link quality indicator (LQI) thresholds, which can be used by the initiator device to remove certain responder devices from the ranking list. The last three octets 33, 34, 35 contain descriptors, which can be used by the initiator device to rank the responder devices.

FIG. 6 shows an example format of a descriptor 33, 34, 35. It comprises four fields:

Score. The score field 41 is four bits in length, it is used by the initiator device to rank responders. A higher number will result in a higher ranking.

Duplicate Score Handling. This field 42 is two bits in length as four actions are possible in the event of a duplicate score. Possible values of this field, and the associated actions, are shown in FIG. 7. This field indicates what should happen with the responder device if another responder device with the exact same score is discovered by the initiator device.

Apply Strict LQI Threshold. This field 43 is one bit in length. It indicates if the Strict LQI Threshold should be applied to this responder. If this bit is set, and the LQI of the discovery response for this responder is lower than the Strict LQI Threshold, the responder is removed from the list.

Referring again to FIG. 5, the discovery response 30 comprises two LQI thresholds: a Basic LQI Threshold 31 and a Strict LQI Threshold 32. The Basic LQI Threshold 31 is one octet in length. The LQI value of the discovery response can be used as a way of determining if the discovery response of that device should be considered. For example, if the LQI value for a responder device is less than the Basic LQI Threshold, the responder device can be removed from the list of Binding Candidates. The Strict LQI Threshold is one octet in length. If the LQI value of the discover/response for this responder is less than the Strict LQI Threshold 32 AND the Strict LQI Threshold needs to be applied (i.e. field 43 is set) according to the applicable descriptor, the responder is removed from the list of Binding Candidates.

The discovery response 30 can comprise up to three descriptors (our implementation limits itself to three descriptors, but there could be more in a more general case): a primary descriptor 33, a secondary descriptor 34 and a tertiary descriptor 35. Each descriptor has the format shown in FIG. 6. In general, the descriptors are intended to be considered in the order: primary, secondary, tertiary. The secondary descriptor is only used when the responder needs to be re-ranked. For example, if the score 41 of the primary descriptor is not unique (multiple responders returned the same score) and the 'Duplicate Score Handling' field 42 of the primary descriptor 33 indicates that the initiator device should 'Re-rank responder'. The tertiary descriptor is only used when the responder needs to be re-ranked a second time. For example, if the scores 41 of the both primary and secondary descriptors 33, 34 are not unique and the 'Duplicate Score Handling' field 42 of both the primary and secondary descriptors 33, 34 indicate 'Re-rank responder'. The 'Duplicate Score Handling' field 42 of the tertiary descriptor 35 should not indicate 'Re-rank responder' as there are no further descriptors to consider. If the responder does not specify secondary and/or tertiary descriptors, the fields 34, 35 can be left blank.

A discovery response comprises:
  a primary descriptor comprising the computed score and a duplicate score handling element, in which the duplicate score handling element indicates an action to be taken by the initiator device in the event that another responder device has the same score as the score in the primary descriptor of the responder device;
  a secondary descriptor comprising a computed score. Advantageously, the score in the secondary descriptor is lower than the score carried in the primary descriptor. Advantageously, the secondary descriptor also has a duplicate score handling element indicating an action to be taken by the initiator device in the event that another responder device has the same score as the score in the secondary descriptor of the responder device. The action indicated by this duplicate score handling element can be different from the one carried in the primary descriptor. The secondary descriptor only being intended to be used by the initiator device, when the score in the primary descriptor of the responder device equals the score of another responder device and the duplicate score handling element of the first primary descriptor of the responder indicates the "re-rank of the responders using another descriptor of the discovery response" option.

An example of calculating a lower score will now be described. A parameter like "Responder was bound to this initiator before" could have a high weight in the weighted sum. If two responders report that they were bound to the initiator, this parameters loses its value. The primary descriptor would be the weighted sum of all parameters including the "Responder was bound to this initiator before", the secondary descriptor would then contain the weighted sum excluding the "Responder was bound to this initiator before".

Example of Descriptors Generation at the Responder Side

When a discovery request is received from an initiator device 11, the responder device generates the discovery response, including the status information that comprises up to three descriptors 33-35. Each of these descriptors 33-35 represents a certain scenario. Depending on the active scenario, the responder will select the proper descriptor and use this one as the primary descriptor in the status information of the discovery response. In case the 'Duplicate Score Handling' is set to 'Re-rank responder' for the selected scenario, a secondary descriptor is selected as well, corresponding to an alternative scenario. In case also the secondary descriptor has the 'Duplicate Score Handling' set to 'Re-rank responder', a tertiary descriptor is selected as well, corresponding to yet another alternative scenario.

Table 1 shows an example of the descriptor generation based on certain scenarios. The weighted sum is calculated based on the sum of the weights of all fulfilled conditions given in Table 2. The combination of these two tables results in the descriptor generation shown in Table 3. As this descriptor generation process is performed entirely on the responder device, the logic used to generate the descriptor(s) can be updated in the field, such as by a software/firmware update of the responder device.

Three example scenarios are described in detail below.

Example 1

Pre-Commissioning

Consider that the initiator device, from which a discovery request is received, is "pre-commissioned" (in the factory) to the responder device.

The primary descriptor is formed as indicated by the 'Pre-Commissioning' scenario in Table 1: 'Score' is 14, 'Duplicate Score Handling' is set to 'Re-rank' and 'Apply Strict LQI Threshold' is set to False.

As the 'Duplicate Score Handling' field 42 is set to 'Re-rank responder' for the primary descriptor 33, an alternative scenario will be selected as well to cover the case in which more than one responder device will be discovered that indicates that it is pre-commissioned with the initiator device. Consider that the responder device is also showing the binding description screen and there is line of sight between the responder device and the initiator device. The responder device booted a long time ago and the binding table is not empty (i.e. the responder device has already formed a binding with another controller). In this case, the weighted sum is 1*2+1*2+0*1+0*1=4. The secondary descriptor 34 is formed as indicated by the 'Weighted sum=4' scenario: 'Score' is 4, 'Duplicate Score Handling' is set to 'Use As Is' and 'Apply Strict LQI Threshold' is set to False. As the 'Duplicate Score Handling' field 42 is not set to 'Re-rank responder' for the secondary descriptor 34, the tertiary descriptor is not required.

Example 2

Button Binding

Consider that the responder device supports only button binding and that the bind button is pressed on the responder device at the moment the discovery request from the initiator device is received. The primary descriptor is formed as indicated by the 'Button binding, in case bind button of responder is pressed first' scenario: 'Score' is 2, 'Duplicate Score Handling' is set to 'Remove From List', and 'Apply Strict LQI Threshold' is set to False. As the 'Duplicate Score Handling' is not set to 'Re-rank responder' for the primary descriptor, the secondary descriptor 34 and the tertiary descriptor 35 are not required and the respective fields of the discover response are left blank.

Example 3

Initial Binding

Consider that the responder device has just booted up the first time at the moment the discovery request is received from the initiator device and that the hybrid IR/RF based initiator is within line of sight. Furthermore, the responder device is showing the binding description screen and its binding table is empty. In this case, the weighted sum is 1*2+1*2+1*1+1*1=6. The primary descriptor is built up as indicated by the 'Weighted sum=6' scenario: 'Score' is 6, 'Duplicate Score Handling' is set to 'Use As Is' and 'Apply Strict RSSI Threshold' is set to False. As the 'Duplicate Score Handling' is not set to 'Re-rank responder' for the primary descriptor, the secondary descriptor 34 and the tertiary descriptor 35 are not required and the respective fields of the discovery response are left blank.

FIG. 8 shows a method performed at the initiator device 11 during the authentication phase (24, FIG. 2) of the binding process. At step 131 the initiator device checks if the list of binding candidates is empty. At step 132 the initiator device sets up a temporary link with one of the responders. Typically, the first responder device that is selected is the one having the highest ranking in the list of binding candidates. Step 133 checks if this is successful and, if it is successful, the method proceeds to step 134 to authenticate the responder device. If authentication is successful, a permanent binding has been formed between the initiator device and that responder device. If step 133 or step 135 is unsuccessful, the method can attempt to complete a binding with the responder device having the next highest score. The method can continue until the list of binding candidates is empty, or the user aborts the method.

The binding method shown in FIG. 4 can be performed in an automatic, or a semi-automatic, manner. The authentication step typically requires user interaction. The method can select a binding candidate and can proceed (without user intervention) to set up a link with the highest ranked binding candidate. Alternatively, the method can report (e.g. via a display of the initiator device) the highest ranked binding candidate and can request the user to confirm if they wish to proceed with that candidate. The method can report other binding candidates, and can allow a user to select one of the other binding candidates instead of the highest ranked binding candidate.

Advantageously, the logic at the target device can be manipulated in real-time, e.g. during a service call, to ensure desired behaviour. Consider an example where a customer calls to a support centre because the customer has failed to bind his remote control to a STB. The support person can log in to the STB over a communication network and put the STB in to a special state. In this state, the STB will report very high scores in the discovery responses to make sure the STB will end up at the top of the list after the ranking process.

Figure 9:
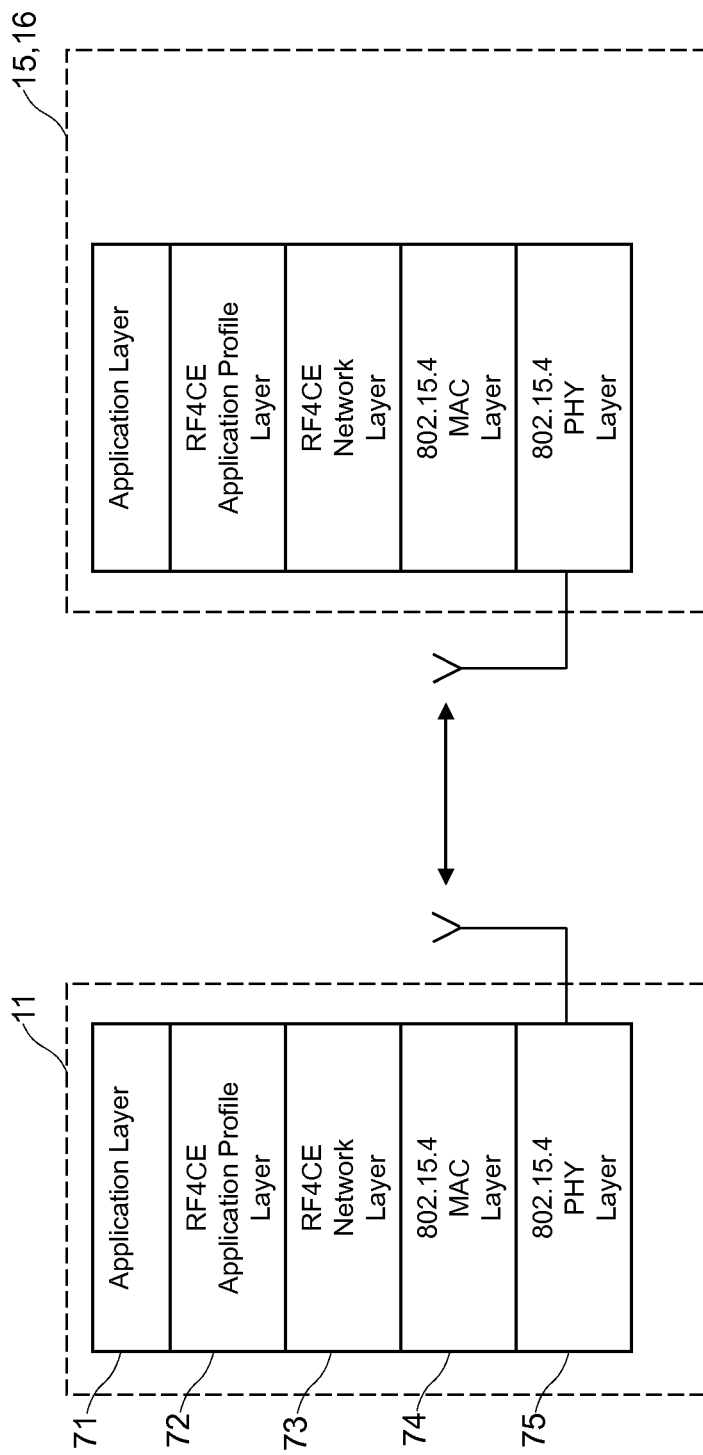
FIG. 9 shows protocol layers at an initiator device and responder device.
Figure 10:
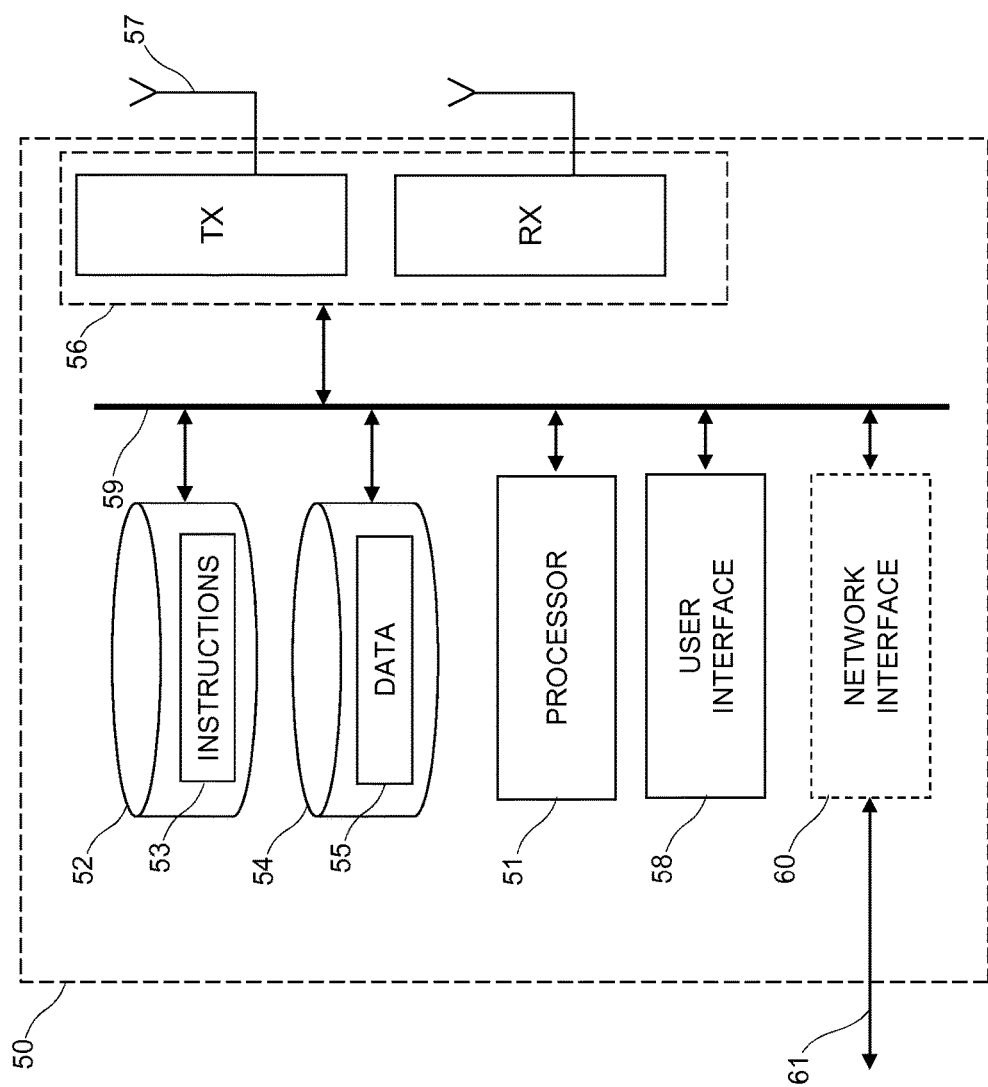
FIG. 10 shows functional modules at an initiator device and responder device.

FIGS. 9 and 10 shows apparatus at an initiator device 11 and a responder device 15, 16. FIG. 9 shows network layers. Working up from the bottom, there is a physical layer 75. For ZigBee, this is based on IEEE 802.15.4. Above this is a Medium Access Control (MAC) layer 74, also based on IEEE 802.15.4. Above this is are: an RF4CE network layer 73; an RF4CE Application Profile layer 72 and an Application layer 71.

In FIG. 9, the RF4CE Application Profile can comprise: ZigBee Interface Device (ZID), ZigBee 3D Sync (Z3S), or ZigBee Remote Control (ZRC). Other profiles can be defined on a standardised or proprietary basis. ZigBee Interface Device (ZID) was developed for touch pads, mice, keyboards, wands, etc., for use with a variety of laptops, computers, TV sets, set-top boxes and other electronic devices. The ZID profile allows consumers to use their devices from greater distances, or even from another room, because operation is not limited to line of sight. ZigBee 3D Sync (Z3S) is intended as a global standard for more convenient, flexible and enjoyable 3D HD viewing. By using RF instead of IR, users have not to point a remote control to a target device and have greater freedom for personal movement without disrupting the 3D view when wearing 3D glasses. ZigBee Remote Control (ZRC) is intended as a global standard for advanced, greener and easy-to-use RF remotes that removes line-of-sight restrictions while also delivering two-way communication, longer range of use and extended battery life. ZigBee Remote Control can also be used to connect and monitor home sensing applications such as air conditioning and heating, home security sensors, home health monitors, etc. Unlike IR remotes, ZigBee Remote Control also supports interactivity which means that ZRC could support the use of display screens on the remote that could be used to show the volume controls of devices being controlled, what stations are being tuned, and even be used to set up and manage the recording of TV shows and movies on a DVR. Of special interest to the cable companies and service providers is the capability to support interactive shopping and polling.

The method described above is applicable to any of these existing profiles, to future profiles which may be developed, and to proprietary profiles.

FIG. 10 shows an exemplary form of a wireless device 50 which may be used as an initiator device 11 or as a responder device 15, 16. The wireless device 50 may implement the method shown in any of FIG. 3, 4 or 8. The wireless device 50 comprises one or more processors 51 which may be microprocessors, controllers or any other suitable type of processors for executing instructions to control the operation of the device. The processor 51 is connected to other components of the device via one or more buses 59. Processor-executable instructions 53 may be provided using any computer-readable media, such as memory 52. The memory is of any suitable type such as read-only memory (ROM), random access memory (RAM), a storage device of any type such as a magnetic or optical storage device. Additional memory 54 can be provided to store data 55 used by the processor 51. For example, in a responder device parameter values may be stored in memory 54 and in an initiator device discovery responses may be stored in memory 54. The device 50 comprises a transceiver 56 comprising a transmitter for transmitting wireless signals to other devices and a receiver for receiving wireless signals from other devices. The transceiver 56 has one or more antennas 57. A user interface 58 is provided for receiving inputs from a user, for providing outputs to a user. The user interface 5$ can comprise one or more of a keypad, buttons, touchpad, touchscreen, display. The wireless device 50 may comprise a network interface 60 for connecting 61 with an external network, such as the Internet. In a remote control system, the network interface is typically only provided at a responder device 15, 16 such as a television, set-top box or media player (if at all), and is typically not provided at the initiator device 11. Network interface 60 may be used to update the instructions 53 used to implement the method described above. For example, a change to the logic used to calculate the score or duplicate score handling options can be made by updating instructions 53 via interface 60.

Although one processor 51 is shown in FIG. 10, a typical implementation will comprise multiple processors, such as a mixed signal processor for implementing the physical layer 75 of the transmitter 56 and receiver 57, and a separate processor for implementing the RF4CE protocol layers 72, 73, 802.15.4 MAC layer 74 and the application layer 71. Other distributions of these layers, and functions, across one or more processors is possible, as will be well understood by a skilled person.

The method of binding devices has been described with reference to Personal Area Networks (PAN). The method can also be applied to Wireless Local Area Networks (WLAN), Body Area Networks, Home Area Networks and Electronic Shelf Tag Networks.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

APPENDIX

TABLE 1

Descriptor per scenario

| | | Descriptor | |
|---|---|---|---|
| Scenario | Score | Duplicate Score Handling | Apply Strict RSSI Threshold |
| Pre-Commissioning | 14 | Reclassify | False |
| Button binding, in case bin d button of responder is pressed first | 12 | Remove from list | False |

TABLE 1-continued

Descriptor per scenario

| | | Descriptor | |
|---|---|---|---|
| Scenario | Score | Duplicate Score Handling | Apply Strict RSSI Threshold |
| Binding after battery replacement on initiator | 10 | Reclassify | False |
| Weighted sum = 6 | 6 | Use as is | False |
| Weighted sum = 5 | 5 | Use as is | False |
| Weighted sum = 4 | 4 | Use as is | False |
| Weighted sum = 3 | 3 | Use as is | False |
| Weighted sum = 2 | 2 | Use as is | False |
| Weighted sum = 1 | 1 | Use as is | False |
| Weighted sum = 0 | 0 | Use as is | True |

TABLE 2

Weights for different conditions

| Condition | Description | Weight |
|---|---|---|
| Binding Description Screen Visible (BDSV) | The responder is showing the screen with describes the binding process. | 2 |
| Line Of Sight (LOS) | The initiator has an IR link with the responder. | 2 |
| Empty Pairing Table (EPT) | The RF binding table of the responder is still empty | 1 |
| Just Booted (JB) | The responder has just booted | 1 |

TABLE 3

Descriptor per scenario

| | | | | | | | Descriptor | |
|---|---|---|---|---|---|---|---|---|
| Scenario | | | | | | Score | Duplicate Score Handling | Apply Strict RSSI Threshold |
| Pre-commissioning | | | | | | 14 | Reclassify | False |
| Button binding, in case bind button of responder is pressed first | | | | | | 12 | Remove from list | False |
| Binding after battery replacement on initiator | | | | | | 10 | Reclassify | False |
| | SUM | BDSV | LOS | EPT | JB | | | |
| Initial Binding with Line Of Sight and Pairing Description Screen Visible | 6 | 2 | 2 | 1 | 1 | 6 | Use as is | False |
| Delayed Initial Binding or Binding after Warehousing, with Line Of Sight and Binding Description Screen Visible | 5 | 2<br>2 | 2<br>2 | 1<br>0 | 0<br>1 | 5 | Use as is | False |
| Binding after Controller Replacement with Line Of Sight with Binding Description Screen Visible | 4 | 2 | 2 | 0 | 0 | 4 | Use as is | False |
| Initial Binding with either Line Of Sight, or Binding Description Screen Visible | | 2<br>0 | 0<br>2 | 1<br>1 | 1<br>1 | | | |
| Delayed Initial Binding or Binding after Warehousing, with either Line Of Sight or Binding Description Screen Visible | 3 | 2<br>2<br>0 | 0<br>0<br>2 | 1<br>1<br>0 | 0<br>1<br>1 | 3 | Use as is | False |
| Binding after Controller Replacement with either Line Of Sight or Binding Description Screen Visible | 2 | 2<br>0 | 0<br>2 | 0<br>0 | 0<br>0 | 2 | Use as is | False |
| Initial Binding without Line Of Sight and without Binding Description Screen Visible | | 0 | 0 | 1 | 1 | | | |
| Delayed Initial Binding or Binding after Warehousing, without Line Of Sight, and without Binding Description Screen Visible | 1 | 0<br>0 | 0<br>0 | 1<br>0 | 0<br>1 | 1 | Use as is | False |

TABLE 3-continued

Descriptor per scenario

| Scenario | | | | Score | | | Descriptor Duplicate Score Handling | Apply Strict RSSI Threshold |
|---|---|---|---|---|---|---|---|---|
| Binding after Controller Replacement without Line Of Sight, without Binding Description Screen Visible | 0 | 0 | 0 | 0 | 0 | 0 | Use as is | True |

The invention claimed is:

1. A method for use in a wireless personal area network (WPAN) comprising an initiator device and a plurality of responder devices which can bind with the initiator device, characterized in that the method comprises, at one of the plurality of responder devices:
receiving a discovery request from the initiator device;
forming a discovery response; and
sending the discovery response to the initiator device,
wherein the step of forming the discovery response comprises:
collecting at least two parameters, which comprise at least one of the following:
a parameter indicating whether a line of sight connection exists between the initiator device and the responder device;
a parameter indicating that the responder device is within a predetermined range of the initiator device;
a parameter indicating that the responder device is not yet bound with any other device;
a parameter indicating a time period since the responder device was rebooted, or indicating that a predetermined time period has elapsed since the responder device was rebooted;
a parameter indicating that the responder device is currently in an operating state to form a binding; and
a parameter indicating that the initiator device is a default controller for the responder device;
computing a score using the at least two parameters, the score being indicative of a likelihood of the initiator device wanting to bind with the responder device;
including the score as an element of the discovery response; and
including a duplicate score handling element, which indicates one of a plurality of actions to be taken by the initiator device in the event that another responder device has the same score as the responder device.

2. A method according to claim 1 wherein the duplicate score handling element indicates one of the following actions:
keeping responder devices having the same score in a ranking list of the initiator device and ordering them using a tie break function;
removing responders with the same score from a ranking list of the initiator device;
aborting the discovery procedure when two or more responder devices with the same score are discovered;
re-ranking the responder devices using another descriptor of the discovery response.

3. A method according to claim 1 wherein the step of forming the discovery response comprises:
forming a primary descriptor comprising the score and the duplicate score handling element, in which the duplicate score handling element indicates one option for how the initiator device should behave in the event that another responder device has the same score as the score in the primary descriptor of the responder device; and
forming a secondary descriptor comprising a computed score that is lower than the score in the primary descriptor.

4. A method according to claim 1 wherein the step of forming a discovery response further comprises including a link quality threshold as an element of the discovery response.

5. A method according to claim 4 wherein the link quality threshold is one of:
a link quality threshold which the initiator device should apply to the discovery response from this responder and should remove the responder device from a ranking list if the measured link quality is worse than the threshold;
a link quality threshold which the initiator device should apply to the discovery response from this responder, only if an element in the discovery response indicates to do so.

6. The method according to claim 1, wherein the score is represented by at least 2 bits.

7. The method according to claim 1, wherein the duplicate score handling element is represented by at least 2 bits.

8. The method according to claim 1, wherein the at least two parameters comprise a link quality.

9. A method for use in a wireless personal area network (WPAN) comprising an initiator device and a plurality of responder devices, characterized in that the method comprises, at the initiator device:
sending a discovery request to discover responder devices;
receiving a discovery response from each of a plurality of responder devices, wherein each of the discovery responses comprises a score that is computed by the responder device and based on at least two parameters collected by the responder device, and a duplicate score handling element that indicates one of a plurality of actions to be taken by the initiator device in the event that duplicate score handling elements from two or more responder devices are received by the initiator device, wherein the at least two parameters comprise at least one of the following:
a parameter indicating whether a line of sight connection exists between the initiator device and the responder device;

a parameter indicating that the responder device is within a predetermined range of the initiator device;
a parameter indicating that the responder device is not yet bound with any other device;
a parameter indicating a time period since the responder device was rebooted, or indicating that a predetermined time period has elapsed since the responder device was rebooted;
a parameter indicating that the responder device is currently in an operating state to form a binding; and
a parameter indicating that the initiator device is a default controller for the responder device; and
ranking the plurality of responder devices using the scores.

10. A method according to claim 9 further comprising attempting to complete a binding with the responder device having the highest score.

11. A method according to claim 9 wherein the duplicate score handling element indicates one of the following options:
keeping the responder devices having the same score in the ranking and order according to a tie breaker function;
removing responder devices with the same score from a ranking list of the initiator device;
aborting the discovery procedure when two or more responder devices with the same score are discovered;
re-ranking the responder devices using another descriptor of the discovery response.

12. A method according to claim 9 wherein:
the discovery response received from each responder device comprises:
a primary descriptor comprising the score and the duplicate score handling element, in which the duplicate score handling element indicates one option for an action to be taken by the initiator device in the event that another responder device has the same score as the score in the primary descriptor of the responder device; and
a secondary descriptor comprising a computed score that is lower than the score in the primary descriptor; and
the step of ranking the responder devices uses the primary descriptor in each of the discovery responses before using the secondary descriptor.

13. A method according to claim 9 further comprising measuring a link quality of the discovery response, comparing the measured link quality with a link quality threshold, and removing the responder device from the ranking list if the measured link quality is worse than the link quality threshold.

14. A method according to claim 9 further comprising measuring a link quality of the discovery response, comparing the measured link quality with a link quality threshold, and removing the responder device from the ranking list if the measured link quality is lower than the link quality threshold, if an element that is carried in the discovery response indicates to do so.

15. The method according to claim 9, wherein the score is represented by at least 2 bits.

16. The method according to claim 9, wherein the duplicate score handling element is represented by at least 2 bits.

17. The method according to claim 9, wherein the at least two parameters comprise a link quality.

18. A wireless system comprising:
an initiator device which sends a discovery request; and
a plurality of responder devices bound with the initiator device, wherein one of the plurality of responder devices receives the discovery request from the initiator device, forms a discovery response, and sends the discovery response to the initiator device, wherein the one of the plurality of responder devices forming the discovery response comprises:
the one of the plurality of responder devices collecting at least two parameters, which comprise at least one of the following:
a parameter indicating whether a line of sight connection exists between the initiator device and the one of the plurality of responder devices;
a parameter indicating that the one of the plurality of responder devices is within a predetermined range of the initiator device;
a parameter indicating that the one of the plurality of responder devices is not yet bound with any other device;
a parameter indicating a time period since the one of the plurality of responder devices was rebooted, or indicating that a predetermined time period has elapsed since the one of the plurality of responder devices was rebooted;
a parameter indicating that the one of the plurality of responder devices is currently in an operating state to form a binding; and
a parameter indicating that the initiator device is a default controller for the one of the plurality of responder devices;
the one of the plurality of responder devices computing a score using the at least two parameters, the score being indicative of a likelihood of the initiator device wanting to bind with the one of the plurality of responder devices;
the one of the plurality of responder devices including the score as an element of the discovery response; and
the one of the plurality of responder devices including a duplicate score handling element, which indicates one of a plurality of actions to be taken by the initiator device in the event that another of the plurality of responder devices has the same score as the one of the plurality of responder devices.

* * * * *

UNITED STATES PATENT AND TRADEMARK OFFICE
CERTIFICATE OF CORRECTION

PATENT NO. : 9,955,407 B2  
APPLICATION NO. : 13/704924  
DATED : April 24, 2018  
INVENTOR(S) : Bram Van Den Bosch, Wilhelmus Van Hoogstraeten and Jan Van Eetvelde Page 1 of 1

It is certified that error appears in the above-identified patent and that said Letters Patent is hereby corrected as shown below:

In the Specification

In Column 9, Line 13, replace "a field Which" with --a field which--.

In Column 10, Line 30, replace "in length, it is" with --in length. It is--.

In Column 10, Line 55, replace "discover/response" with --discovery response--.

In Column 12, Line 55, replace "discover response" with --discovery response--.

In Column 13, Line 42, replace "STB in to a special" with --STB in a special--.

In Column 14, Line 42, replace "user interface 5$" with --user interface 58--.

Signed and Sealed this  
Nineteenth Day of June, 2018

Andrei Iancu  
*Director of the United States Patent and Trademark Office*